(12) United States Patent
Fukai (10) Patent No.: US 8,774,615 B2
(45) Date of Patent: Jul. 8, 2014

(54) LENS BARREL THAT PERFORMS PHOTOGRAPHIC LENS EXTENSION AND RETRACTION, IMAGE PICKUP APPARATUS INCLUDING LENS BARREL

(75) Inventor: Yosuke Fukai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 50 days.

(21) Appl. No.: 13/542,082

(22) Filed: Jul. 5, 2012

(65) Prior Publication Data

US 2013/0016961 A1    Jan. 17, 2013

(30) Foreign Application Priority Data

Jul. 12, 2011    (JP) .................................. 2011-153874

(51) Int. Cl.
G03B 17/00    (2006.01)
G03B 11/04    (2006.01)
G03B 17/04    (2006.01)

(52) U.S. Cl.
CPC .............. G03B 11/043 (2013.01); G03B 17/04 (2013.01)
USPC ........................................... 396/72; 396/448

(58) Field of Classification Search
CPC .............................. G03B 11/043; G03B 17/04
USPC ........................................ 396/448, 72, 76, 85
See application file for complete search history.

(56) References Cited

U.S. PATENT DOCUMENTS

2007/0217783 A1*   9/2007  Nishijima ..................... 396/448

FOREIGN PATENT DOCUMENTS

| JP | 2007-248608 A | 9/2007 |
| JP | 2008-026716 A | 2/2008 |

* cited by examiner

*Primary Examiner* — Christopher Mahoney
(74) *Attorney, Agent, or Firm* — Fitzpatrick, Cella, Harper & Scinto (57) ABSTRACT

A lens barrel which can be extended over a larger amount without increasing the length of the lens barrel in a collapsed state. A movable barrel having a cam formed on an inner periphery thereof is movable in an optical axis direction. The movable barrel is extended toward an object in a shooting state, and is housed in a collapsed state. A lens holding frame holds a first lens group disposed closest to an object side of lens groups arranged in the optical axis direction. The lens holding frame including a fitting portion for slidably fitting to the cam is capable of moving in the optical axis direction, following a profile line of the cam. Barrier blades are disposed on the object side of the first lens group. A barrier drive ring is connected to the lens holding frame is rotatable to open and close the barrier blades.

7 Claims, 11 Drawing Sheets

LENS BARREL THAT PERFORMS PHOTOGRAPHIC LENS EXTENSION AND RETRACTION, IMAGE PICKUP APPARATUS INCLUDING LENS BARREL

BACKGROUND OF THE INVENTION

1. Field of the Invention

The present invention relates to a lens barrel for use in an image pickup apparatus, such as a digital camera, and more particularly to a collapsible zoom lens barrel configured to perform photographic lens extension and retraction in a so-called digital camera and the construction of an image pickup apparatus including the zoom lens barrel.

2. Description of the Related Art

As a collapsible zoom lens mechanism for extending and retracting a lens barrel, which is used in a digital camera or the like, there has been known a method using cams. This method uses a lens barrel held in a manner movable along an optical axis with its rotation restricted, and a rotary barrel formed with a cam groove. More specifically, a follower pin provided in the lens barrel is slidably fitted in the cam groove formed in the rotary barrel, whereby the lens barrel can be moved in the optical axis direction, following the profile line (path) of the cam groove in accordance with rotation of the rotary barrel. Thus, at the time of shooting, a photographic lens is extended to a predetermined position, whereas at the time of non-shooting, the lens barrel is retracted into a body of the digital camera.

In recent years, it has been strongly demanded to achieve a higher optical zoom magnification and reduction of thickness of a zoom lens barrel in a digital camera. For this reason, in a case where a digital camera is configured such that its lens barrel is housed in the body of the digital camera at the time of non-shooting, it is becoming difficult to extend its photographic lens over a sufficient distance at the time of shooting only by the above-mentioned method using a cam.

To solve this problem, there have been proposed a first mechanism and a second mechanism mentioned below as examples of a mechanism for extending and retracting a lens barrel. The first mechanism is configured such that an optical element-holding member and an optical element-driving member are urged in a predetermined direction by a spring member, and when a lens barrel is to be retracted, the optical element-holding member and the optical element-driving member are caused to perform pivotal motion relative to each other in a direction against the urging force of the spring member (see Japanese Patent Laid-Open Publication No. 2008-26716). On the other hand, the second mechanism is configured such that a barrier opening and closing device is provided with a cam projection, and the barrier opening and closing device is rotated when barrier blades are open, whereby the cam projection causes a lens holding frame, via a slide pin of the same, to project from a shooting opening (see Japanese Patent Laid-Open Publication No. 2007-248608).

However, in the technique described in Japanese Patent Laid-Open Publication No. 2008-26716, there is a fear that when an external force acts, the optical element-holding member can fall out from the lens barrel.

In the technique described in Japanese Patent Laid-Open Publication No. 2007-248608, since the barrier opening and closing device is interposed between a movable barrel and the lens holding frame, there is a fear that dimensional error is increased or lens positioning accuracy is degraded.

SUMMARY OF THE INVENTION

The present invention provides a lens barrel that is capable of being extended over a larger amount (length) without increasing the length of the lens barrel in a collapsed state, and is high in optical positioning accuracy and resistant to a malicious operation from the outside or external forces, and an image pickup apparatus including the lens barrel.

In a first aspect of the present invention, there is provided a lens barrel comprising a movable barrel configured to be movable in an optical axis direction and having a cam formed on an inner periphery thereof, the movable barrel being extended toward an object and moved in the optical axis direction according to a zoom magnification when the lens barrel is in a shooting state, and being housed when the lens barrel is in a collapsed state, a lens holding frame configured to hold a first lens group of a plurality of lens groups arranged in the optical axis direction, which is disposed closest to the object, the lens holding frame including a fitting portion for being slidably fitted to the cam and being capable of moving in the optical axis direction relative to the movable barrel, following a profile line of the cam, a barrier member disposed on a side of the first lens group toward the object and configured to be capable of being opened and closed, and a barrier opening and closing unit connected to the lens holding frame and configured to be rotatable so as to open and close the barrier member, wherein rotation of the barrier opening and closing unit causes the lens holding frame to move in the optical axis direction relative to the movable barrel.

In a second aspect of the present invention, there is provided an image pickup apparatus including a lens barrel that makes it possible perform shooting when in an extended state, wherein the lens barrel comprises a movable barrel configured to be movable in an optical axis direction and having a cam formed on an inner periphery thereof, the movable barrel being extended toward an object and moved in the optical axis direction according to a zoom magnification when the lens barrel is in a shooting state, and being housed when the lens barrel is in a collapsed state, a lens holding frame configured to hold a first lens group of a plurality of lens groups arranged in the optical axis direction, which is disposed closest to the object, the lens holding frame including a fitting portion for being slidably fitted to the cam and being capable of moving in the optical axis direction relative to the movable barrel, following a profile line of the cam, a barrier member disposed on a side of the first lens group toward the object and configured to be capable of being opened and closed, and a barrier opening and closing unit connected to the lens holding frame and configured to be rotatable so as to open and close the barrier member, wherein rotation of the barrier opening and closing unit causes the lens holding frame to move in the optical axis direction relative to the movable barrel.

According to the present invention, it is possible to provide a lens barrel that is capable of being extended over a larger amount (length) without increasing the length of the lens barrel in a collapsed state, and is high in optical positioning accuracy and resistant to a malicious operation from the outside or external forces, and an image pickup apparatus including the lens barrel.

Further features of the present invention will become apparent from the following description of an exemplary embodiment (with reference to the attached drawings).

DESCRIPTION OF THE EMBODIMENTS

The present invention will now be described in detail below with reference to the accompanying drawings showing an embodiment thereof. Note that the dimensions, shape, relative position, etc. of each component part illustrated in the present embodiment can be modified as required according to the configuration of an apparatus to which the present invention is applied, and other various conditions, and the present invention is by no means limited to the present embodiment.

Figure 1:
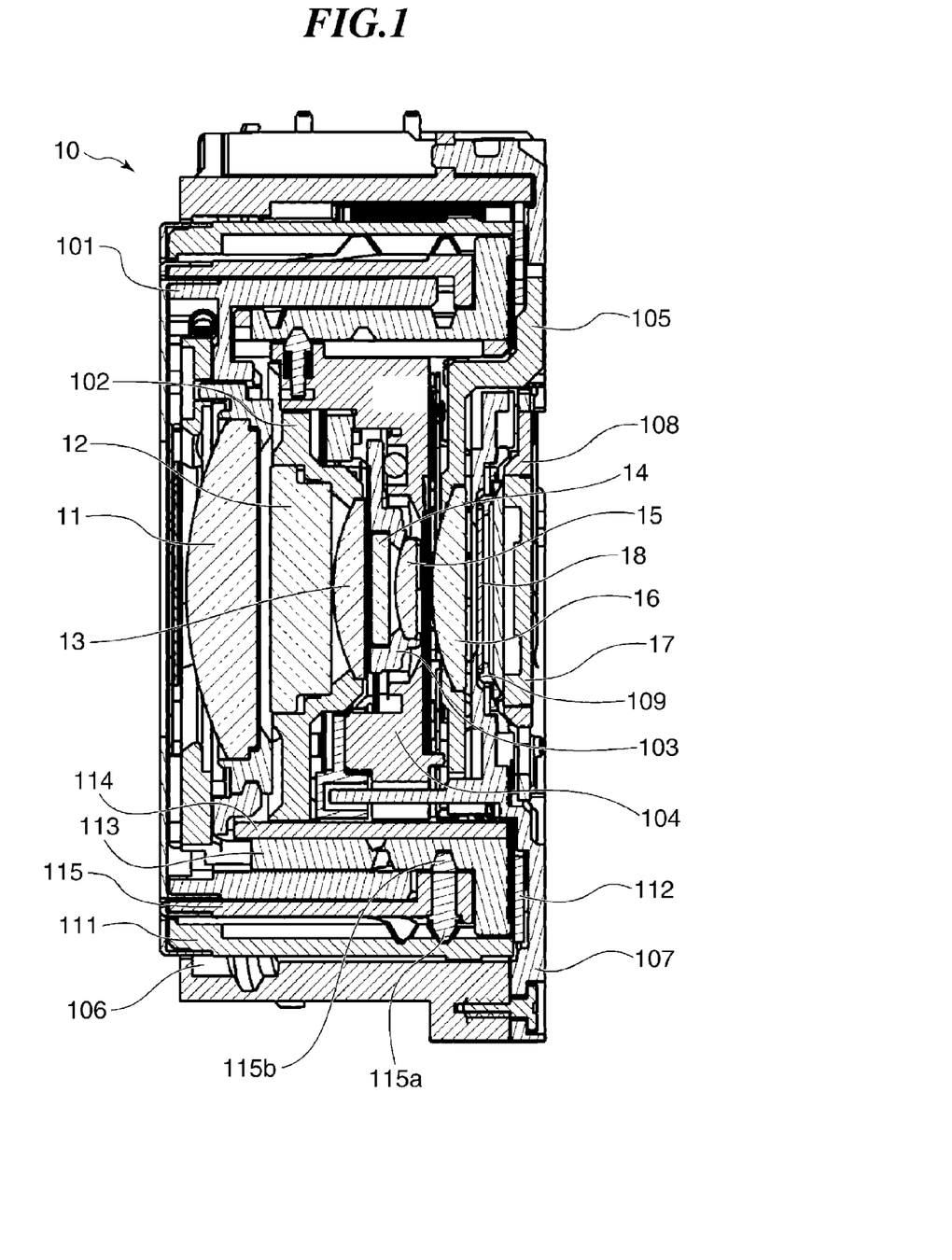
FIG. 1 is a cross-sectional view of the whole arrangement of a lens barrel according to an embodiment of the present invention, in a state collapsed in a digital camera body.
Figure 2:
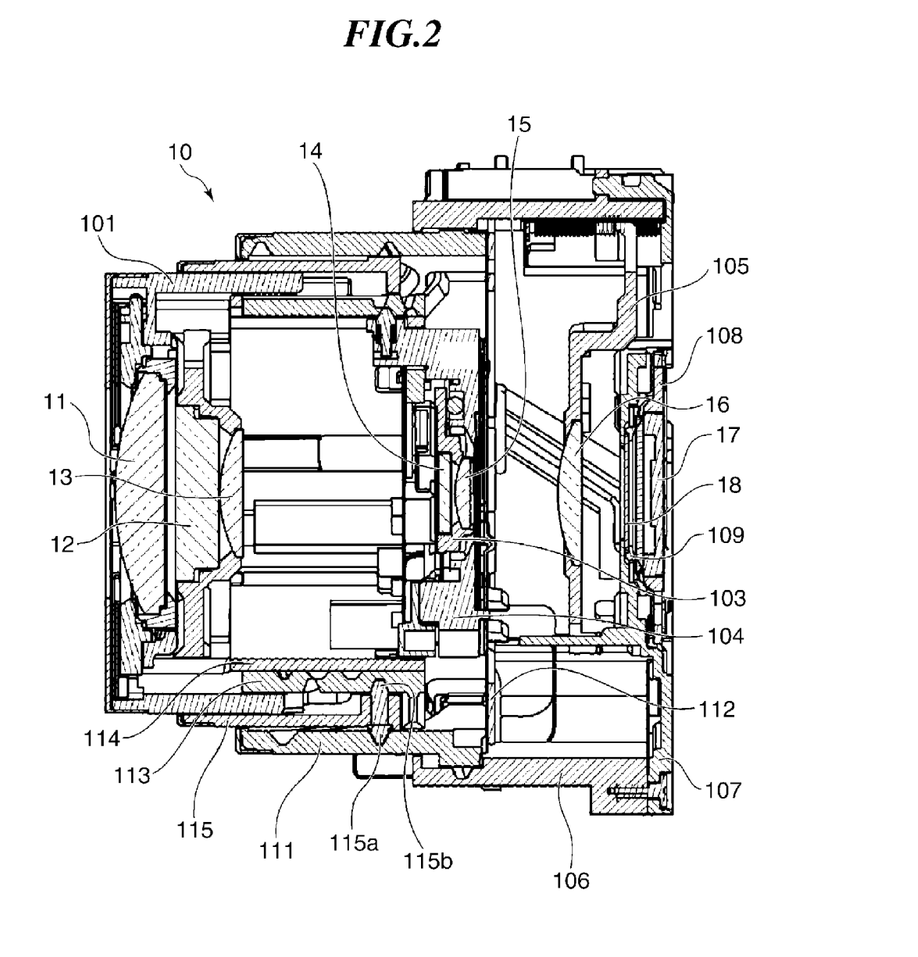
FIG. 2 is a cross-sectional view of the whole arrangement of the lens barrel in a state extended from the digital camera body.
Figure 3:
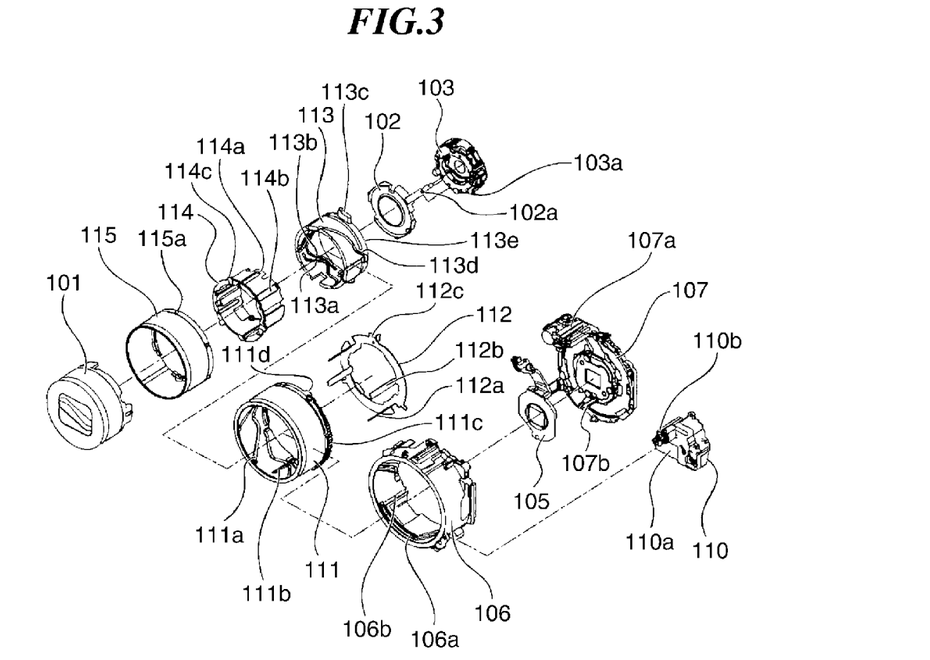
FIG. 3 is an exploded perspective view of the lens barrel.

FIG. 1 is a first cross-sectional view of the whole arrangement of a lens barrel according to the embodiment of the present invention. FIG. 1 shows a state (collapsed state) where the lens barrel is collapsed in a body of a digital camera. FIG. 2 is a second cross-sectional view of the whole arrangement of the lens barrel according to the embodiment. FIG. 2 shows a state (extended state or shooting-ready state) where the lens barrel is extended from the digital camera body. More specifically, FIG. 2 shows a shooting-ready state for wide-angle shooting. FIG. 3 is an exploded perspective view of the lens barrel according to the embodiment.

The lens barrel 10 of the present embodiment is implemented by a zoom lens barrel comprising four lens groups. The lens barrel 10 includes a first-group barrel unit having a first-group barrel 101 as a movable barrel that holds a first lens group 11, and a second-group barrel 102 that holds second lens groups 12 and 13. Further, the lens barrel 10 includes a third-group barrel unit comprising a third-group lens holding member 103 that holds third lens groups 14 and 15 and a third-group base 104 that has a diaphragm and a shutter, and a fourth-group barrel 105 that holds a fourth lens group 16.

The first-group barrel unit, the second-group barrel 102, and the third-group barrel unit are lens groups of a variable power system. The third-group barrel unit is provided with an image blur correction mechanism, and the third-group lens holding member 103 is movable in a direction orthogonal to the photographic optical axis during shooting to thereby correct a blur that occurs during the shooting. The fourth-group barrel 105 is a focus lens group for focusing on an object.

The lens barrel 10 has a fixed cam barrel 106 as a component part of a zoom mechanism and a CCD holder unit 107, and the fixed cam barrel 106 and the CCD holder unit 107 are fastened to each other with screws. In the CCD holder unit 107, a CCD 17 is supported by a CCD plate 108, and an optical filter 18 sandwiched between the CCD holder unit 107 and a CCD rubber 109 is disposed in front of the CCD 17.

The fourth-group barrel 105 is supported by the CCD holder unit 107 such that the fourth-group barrel 105 is rectilinearly movable along the photographic optical axis (hereinafter simply referred to as "the optical axis"). Specifically, a pair of AF guide shafts 107a parallel with the optical axis are press-fitted in the CCD holder unit 107, and a sub guide shaft 107b for restricting rotation is integrally formed with the CCD holder unit 107. Further, guide holes formed in the fourth-group barrel 105 are slidably fitted on the AF guide shafts 107a, respectively.

The fourth-group barrel 105 is constantly urged forward in the optical axis direction (toward an object) by an AF spring (not shown). Further, an AF nut (not shown) is provided at a location forward of the fourth-group barrel 105. As the screw of an AF motor rotates in the AF nut, the fourth-group barrel 105 is moved in the optical axis direction according to the screwing relationship between the AF nut and the screw.

The fixed cam barrel 106 has a gear unit 110 attached thereto, as shown in FIG. 3, and the gear unit 110 comprises a zoom motor 110a as a drive source for causing the lens groups to perform a zoom operation, and a gear train. The zoom motor 110a has a drive shaft to which a gear (not shown) is mounted. When the gear is rotated by a driving force of the zoom motor 110a, the driving force is transmitted to a gear 110b via the gear train to shift the lens barrel 10 in the optical axis direction.

As shown in FIG. 3, the fixed cam barrel 106 has an inner peripheral surface formed with three cam grooves 106a arranged at equal angular intervals of 120 degrees and three straight advance guide grooves 106b extending parallel with the photographic optical axis. A first movable cam barrel 111 is disposed inside the fixed cam barrel 106. The first movable cam barrel 111 has three follower pins 111d integrally formed on an outer peripheral surface thereof such that the three follower pins 111d are slidably fitted in the cam grooves 106a of the fixed cam barrel 106, respectively.

Further, on the outer peripheral surface of the first movable cam barrel 111, there is formed a gear section 111c having gear teeth extending parallel with the photographic optical axis. The gear section 111c is in mesh with the gear 110b of the gear unit 110, so that the driving force of the zoom motor 110a is transmitted from the gear 110b to the gear section 111c. The first movable cam barrel 111 having thus received a rotational force from the gear 110b is moved in the optical axis direction while rotating, following the profile lines (paths) of the cam grooves 106a according to the fitting relationship between the follower pins 111d and the cam grooves 106a of the fixed cam barrel 106.

A first straight advance guide plate 112 is disposed inside the first movable cam barrel 111 in a manner slidable in a direction of rotation of the first movable cam barrel 111 with respect to the first movable cam barrel 111. Although not shown, the first straight advance guide plate 112 is bayonet-coupled to the first movable cam barrel 111.

Further, as shown in FIG. 3, the first straight advance guide plate 112 has two pairs of straight advance guide parts 112a and 112b erected therefrom such that the parts forming each pair are disposed at diametrically opposite locations. Further, the first straight advance guide plate 112 has straight advance guide keys 112c formed at respective three locations on the outer periphery thereof. The three straight advance guide keys 112c are brought into engagement with the three straight advance guide grooves 106b formed in the fixed cam barrel 106, respectively, whereby rotation of the first straight advance guide plate 112 caused during movement of the same in the optical axis direction is restricted.

As described above, the first movable cam barrel 111 and the first straight advance guide plate 112 are bayonet-coupled to each other with little play in the optical axis direction and the radial direction. Therefore, as the first movable cam barrel 111 is moved in the optical axis direction while being rotated by a drive force from the gear train of the gear unit 110, the first straight advance guide plate 112 is also moved in the optical axis direction in a state bayonet-coupled to the first movable cam barrel 111.

As shown in FIG. 3, the first movable cam barrel 111 has an inner peripheral surface formed with three cam grooves 111a arranged at equal angular intervals of 120 degrees and three straight advance guide grooves 111b extending parallel with the optical axis. Inside the first movable cam barrel 111, there are arranged a second movable cam barrel 113 that also functions as a rotary cam barrel, a second straight advance guide barrel 114, and a first-group barrel cover 115.

The first-group barrel cover 115 is disposed outward of the second movable cam barrel 113. The first-group barrel cover 115 has six follower pins 115a formed on the outer peripheral surface thereof and three follower pins 115b formed on the inner peripheral surface thereof. The six follower pins 115a are slidably fitted in the cam grooves 111a formed in the inner peripheral surface of the first movable cam barrel 111.

Figure 4A:
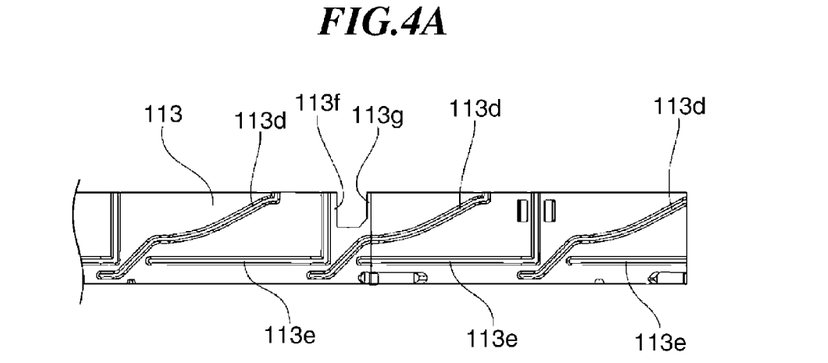
FIG. 4A is an unfolded view of the outer peripheral surface of a second movable cam barrel appearing in FIG. 3.
Figure 4B:
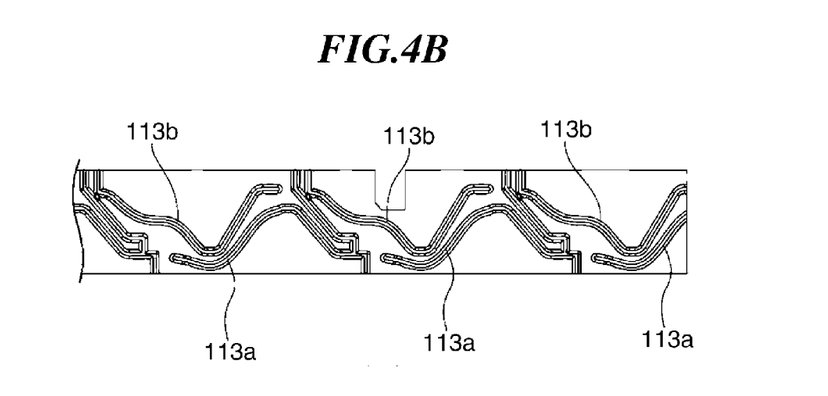
FIG. 4B is an unfolded view of the inner peripheral surface of the second movable cam barrel.

FIG. 4A is an unfolded view of the outer peripheral surface of the second movable cam barrel 113, and FIG. 4B is an unfolded view of the inner peripheral surface of the second movable cam barrel 113. As shown in FIG. 4B, the inner peripheral surface of the second movable cam barrel 113 is formed with three second-group shift cam grooves 113b and three third-group shift cam grooves 113a for shifting the second-group barrel 102 and the third-group barrel unit in the optical axis direction, respectively. The three second-group shift cam grooves 113b and the three third-group shift cam grooves 113a are formed at respective equal angular intervals of 120 degrees.

As shown in FIG. 4A, the outer peripheral surface of the second movable cam barrel 113 is formed with first-group shift cam grooves 113d for shifting the first-group barrel unit in the optical axis direction at equal angular intervals of 120 degrees. Further, the outer peripheral surface of the second movable cam barrel 113 is formed with cam grooves 113e for engagement with the respective follower pins 115b formed on the inner peripheral surface of the first-group barrel cover 115. Each of the cam grooves 113e extends in a circumferential direction about the optical axis, in a range corresponding to a range of operation of the lens barrel 10 from the collapsed state to the shooting-ready state.

Note that the outer peripheral surface of the second movable cam barrel 113 is formed with three guide keys 113c, as shown in FIG. 3. These three guide keys 113c are engaged with the three straight advance guide grooves 111b formed in the inner peripheral surface of the first movable cam barrel 111, respectively, whereby the second movable cam barrel 113 also performs rotation in accordance with rotation of the first movable cam barrel 111.

As described hereinbefore, the second movable cam barrel 113 and the first-group barrel cover 115 are cam-fitted with each other by engagement between the cam grooves 113e formed in the outer peripheral surface of the second movable cam barrel 113 and the follower pins 115b formed on the inner peripheral surface of the first-group barrel cover 115. Although not shown, the first-group barrel cover 115 has fitting parts for fitting with the straight advance guide parts 112a of the first straight advance guide plate 112, and the rotation of the first-group barrel cover 115 is restricted by the first straight advance guide plate 112.

Inside the second movable cam barrel 113, the second straight advance guide barrel 114 is disposed in a manner slidable in the rotational direction of the second movable cam barrel 113 with respect to the second movable cam barrel 113 and in a state bayonet-coupled to the second movable cam barrel 113. Although not shown, the second straight advance guide barrel 114 has fitting parts for fitting with the straight advance guide parts 112b of the first straight advance guide plate 112, and the second straight advance guide barrel 114 is disposed in a state in which the rotation thereof is restricted by the first straight advance guide plate 112. Thus, as the first movable cam barrel 111 is rotated, the second movable cam barrel 113, the second straight advance guide barrel 114, and the first-group barrel cover 115 are moved in unison in the optical axis direction, following the paths of the cam grooves 111a of the first movable cam barrel 111.

As described hereinbefore, the inner peripheral surface of the second movable cam barrel 113 is formed with the second-group shift cam grooves 113b and the third-group shift cam grooves 113a for shifting the second-group barrel 102 and the third-group barrel unit, respectively, in the optical axis direction. The second-group barrel 102 is disposed inside the second straight advance guide barrel 114, and three follower pins 102a formed on the outer periphery of the second-group barrel 102 are slidably fitted in the second-group shift cam grooves 113b formed in the inner peripheral surface of the second movable cam barrel 113, respectively. The third-group barrel unit is also disposed inside the second straight advance guide barrel 114, and three follower pins 103a formed on the outer periphery of the third-group lens holding member 103 are slidably fitted in the third-group shift cam grooves 113a formed on the inner peripheral surface of the second movable cam barrel 113, respectively.

Further, the root portions of the respective follower pins 102a and 103a are fitted in straight advance guide grooves 114a and 114b of the second straight advance guide barrel 114, respectively. With this arrangement, the rotation of the second-group barrel 102 and the third-group lens holding member 103 is restricted.

Figure 5A:
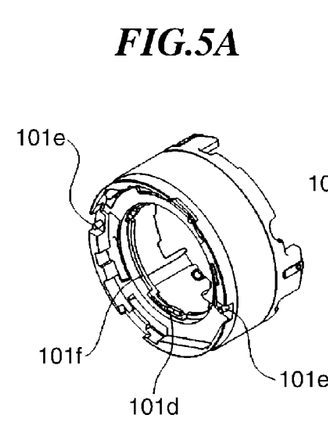
FIG. 5A is a perspective view of a first-group barrel unit appearing in FIG. 3, as viewed from the front thereof.
Figure 5B:
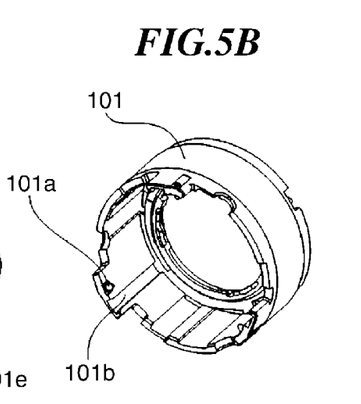
FIG. 5B is a perspective view of the first-group barrel unit appearing in FIG. 3, as viewed from the rear thereof.

The first-group barrel unit is disposed outside the second movable cam barrel 113 and inside the first-group barrel cover 115. FIG. 5A is a perspective view of the first-group barrel unit, as viewed from the front (object side) thereof, and FIG. 5B is a perspective view of the first-group barrel unit, as viewed from the rear (photographer side) thereof.

As described hereinbefore, the outer peripheral surface of the second movable cam barrel 113 is formed with the first-group shift cam grooves 113d for shifting the first-group barrel unit (first-group barrel 101) in the optical axis direction. Further, as shown in FIG. 5B, the inner peripheral surface of the first-group barrel 101 is formed with three follower pins 101a as pin-shaped parts. These three follower pins 101a are slidably fitted in the first-group shift cam grooves 113d formed in the outer peripheral surface of the second movable cam barrel 113, respectively. Further, straight advance guide grooves 101b formed in the inner peripheral surface of the first-group barrel 101 are engaged with guide parts 114c (see FIG. 3) formed on the outer periphery of the second straight advance guide barrel 114, respectively. With this arrangement, the rotation of the first-group barrel 101 is restricted.

The inner peripheral surface of the first-group barrel 101 is formed with three cams 101d at equal angular intervals of 120 degrees. Further, the first-group barrel 101 has two shafts 101e formed at respective locations at diametrically opposite locations. Further, the inner peripheral surface of the first-group barrel 101 is formed with rotation locking parts 101f as engaging parts for contact with a first-group lens-holding frame 21, referred to hereinafter. The cams 101d, the shafts 101e, and the rotation locking parts 101f will be described in detail hereinafter.

As the second movable cam barrel 113 is moved in the optical axis direction while rotating, the first-group barrel unit, the second-group barrel 102, and the third-group barrel unit are shifted in the optical axis direction, following the paths of the first-group shift cam grooves 113d, the second-group shift cam grooves 113b, and the third-group shift cam grooves 113a, respectively.

Figure 6:
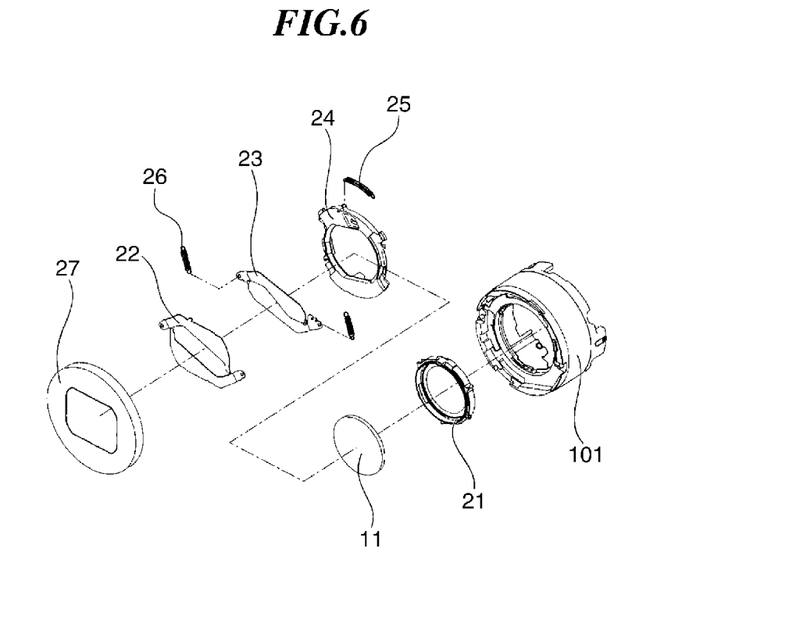
FIG. 6 is an exploded perspective view of the first-group barrel unit shown in FIGS. 5A and 5B.

FIG. 6 is an exploded perspective view of the first-group barrel unit. The first-group barrel unit comprises the first-group lens-holding frame 21 as a lens holding frame for holding the first lens group 11 and the first-group barrel 101 for holding the first-group lens-holding frame 21. At the front end of the first-group barrel 101, there is provided a lens barrier mechanism that operates separately from a shutter in a non-shooting state, to close a shooting opening and protect the photographic optical system. The lens barrier mechanism comprises barrier blades including first barrier blades 22 and second barrier blades 23, a barrier drive ring 24, a barrier opening spring 25, and barrier closing springs 26. The lens barrier mechanism is covered by a barrier cover 27. Note that in the collapsed state, the first lens group 11 is positioned rearward (i.e. on the photographer side) of the first barrier blades 22 and the second barrier blades 23 in the optical axis direction.

The first barrier blades 22 and the second barrier blades 23 protect the photographic optical system. The barrier drive ring 24 functions as a barrier opening and closing unit for transmitting a force for switching between a closed state and an open state of each of the first barrier blades 22 and the second barrier blades 23. The barrier opening spring 25 is a spring member for urging the barrier drive ring 24 in a predetermined direction. More specifically, the barrier opening spring 25 is a tensile spring. The barrier closing springs 26 are tensile springs for urging the first barrier blades 22, the second barrier blades 23 and the barrier drive ring 24 against each other. The barrier cover 27 is formed with the shooting opening.

Figure 7:
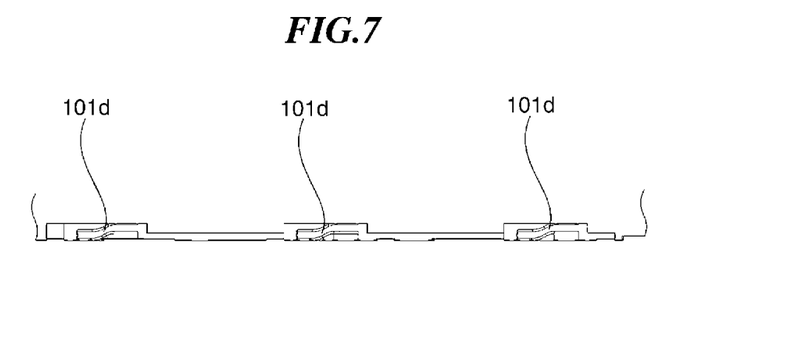
FIG. 7 is an unfolded view of cams formed in the inner peripheral surface of a first-group barrel appearing in FIG. 6.
Figure 8:
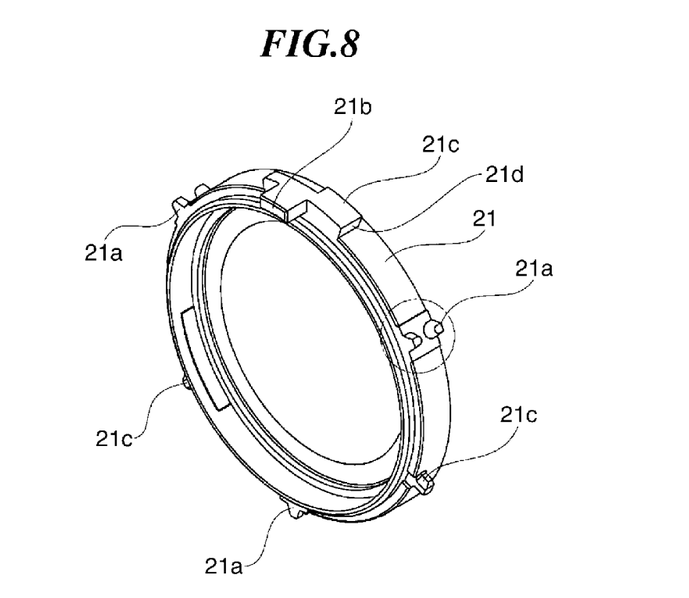
FIG. 8 is a perspective view of a first-group lens-holding frame appearing in FIG. 6.
Figure 9:
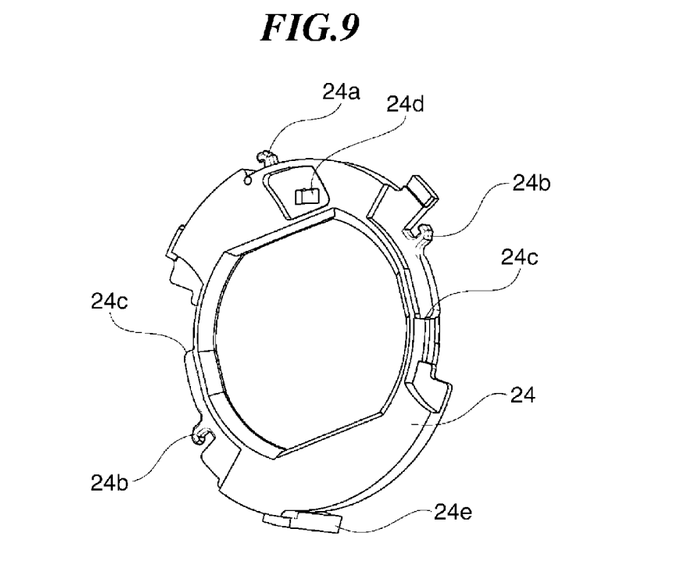
FIG. 9 is a perspective view of a barrier drive ring appearing in FIG. 6.

FIG. 7 is an unfolded view of the cams 101d formed on the inner peripheral surface of the first-group barrel 101. FIG. 8 is a perspective view of the first-group lens-holding frame 21. FIG. 9 is a perspective view of the barrier drive ring 24.

As shown in FIG. 7, each of the cams 101d is formed in a manner extending in the optical axis direction. On the other hand, as shown in FIG. 8, three follower pins 21a, each of which comprises two pin-shaped parts as a pair of engaging parts arranged side by side in the optical axis direction, are formed at equal angular intervals of 120 degrees on the outer periphery of the first-group lens-holding frame 21. The follower pins 21a are slidably fitted on the cams 101d formed on the inner peripheral surface of the first-group barrel 101 in a nipping manner. The dimensions of each cam 101d and those of each follower pin 21a are set such that the fitting between the follower pins 21a and the cams 101d is slightly loose (i.e. such that allowance for sliding is produced).

As shown in FIG. 8, the outer peripheral surface of the first-group lens-holding frame 21 is formed with a rotational force-transmitting projection 21b formed at one location in a manner projecting forward in the optical axis direction, and three static pressure-receiving parts 21c as projection-shaped parts are formed at equal angular intervals of 120 degrees. When an external force is applied to the first-group lens-holding frame 21, the static pressure-receiving parts 21c are brought into contact with the respective three rotation locking parts 101f formed on the first-group barrel 101 as shown in FIG. 5A. Although the follower pins 21a of the first-group lens-holding frame 21 also receive this external force, the static pressure-receiving parts 21c and the rotation locking parts 101f stop the external force, so that it is possible to prevent the follower pins 21a from being disengaged from the respective cams 101d.

As shown in FIG. 9, the barrier drive ring 24 is formed with a first spring hook part 24a to which the barrier opening spring 25 is hooked and second spring hook parts 24b to which the barrier closing springs 26 are hooked. Further, the barrier drive ring 24 is formed with barrier blade contact parts 24c, a rotational force-transmitting hole 24d, and a horn part 24e as a projection. The barrier blade contact parts 24c play the role of opening and closing the first barrier blades 22 and the second barrier blades 23. The rotational force-transmitting hole 24d is fitted on the rotational force-transmitting projection 21b formed on the first-group lens-holding frame 21 and transmits the rotational force of the barrier drive ring 24 to the first-group lens-holding frame 21. The horn part 24e suppresses the urging force applied by the barrier opening spring 25 in the collapsed state of the lens barrel 10.

Figure 10A:
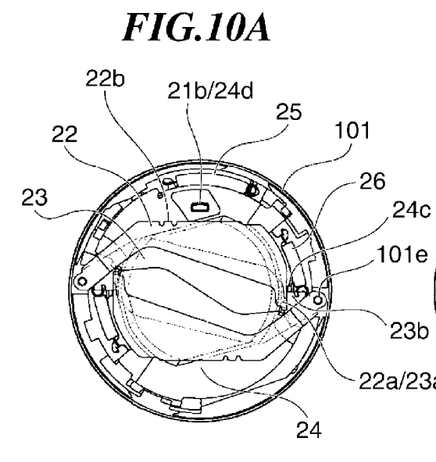
FIG. 10A is a front view showing the closed state of barrier blades appearing in FIG. 6.
Figure 10B:
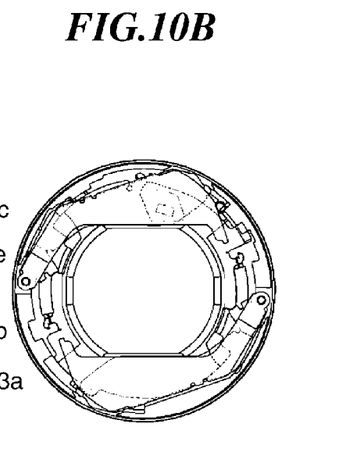
FIG. 10B is a front view showing the open state of the barrier blades appearing in FIG. 6.
Figure 11A:
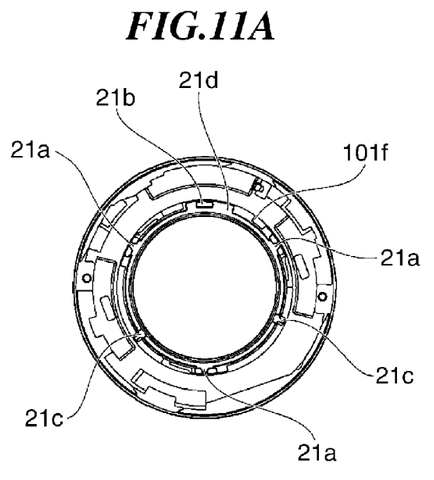
FIG. 11A is a front view showing the first-group lens-holding frame and the first-group barrel appearing in FIG. 6 in a state where the barrier blades are closed.
Figure 11B:
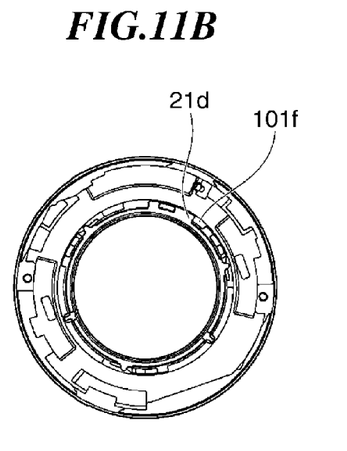
FIG. 11B is a front view showing the first-group lens-holding frame and the first-group barrel appearing in FIG. 6 in a state where the barrier blades are open.

FIG. 10A is a front view showing the closed state of the barrier blades (the first barrier blades 22 and the second barrier blades 23), and FIG. 10B is a front view showing the open state of the barrier blades. FIGS. 11A and 11B are front views of the first-group lens-holding frame 21 and the first-group barrel 101. FIG. 11A shows the first-group lens-holding frame 21 and the first-group barrel 101 in a state where the barrier blades are closed, and FIG. 11B shows the first-group lens-holding frame 21 and the first-group barrel 101 in a state where the barrier blades are open. Note that correspondence in construction between FIGS. 10A and 10B is apparent, and therefore reference numerals are omitted in FIG. 10B.

As described hereinbefore, the follower pins 21a of the first-group lens-holding frame 21 are fitted on the cams 101d of the first-group barrel 101. Further, the rotational force-transmitting projection 21b of the first-group lens-holding frame 21 is fitted in the rotational force-transmitting hole 24d of the barrier drive ring 24, whereby the first-group lens-holding frame 21 and the barrier drive ring 24 are connected to each other. The barrier opening spring 25 is hooked between the barrier drive ring 24 and the first-group barrel 101, and the barrier closing springs 26 are hooked between the barrier drive ring 24 and the second barrier blades 23. The first barrier blades 22 and the second barrier blades 23 are supported by the shafts 101e formed on the first-group barrel 101 and perform opening and closing operations using the shafts 101e as pivots.

When the lens barrel 10 is in the collapsed state, the barrier drive ring 24 receives a spring force of the barrier opening spring 25 for causing clockwise rotation of the barrier drive ring 24. However, since the horn part 24e (see FIG. 9) of the barrier drive ring 24 is held in contact with a contact part 113f (see FIG. 4A) of the second movable cam barrel 113, the rotation of the barrier drive ring 24 is restricted. Note that the contact part 113f is formed as a notch in the second movable cam barrel 113.

In the collapsed state of the lens barrel 10, the spring forces of the barrier closing springs 26 cause the second barrier blades 23 to urge each other in directions for closing the aperture of the barrier cover 27, whereby the closed state is achieved. Further, the first barrier blades 22 and the second barrier blades 23 are interlocked with each other by contact parts 22a formed on the first barrier blades 22 and contact parts 23a formed on the second barrier blades 23. Therefore, when the second barrier blades 23 are closed, the first barrier blades 22 are also closed. Thus, the first barrier blades 22 and the second barrier blades 23 are both closed, whereby the closed state shown in FIG. 10A is achieved.

When the lens barrel 10 is in a shooting state, the barrier drive ring 24 is in a state spaced from the second movable cam barrel 113 in the optical axis direction. When the horn part 24e of the barrier drive ring 24 is moved away from the contact part 113f of the second movable cam barrel 113 (see FIGS. 12A and 12B and FIGS. 13A and 13B, referred to hereinafter), the force of the barrier opening spring 25 is released.

The force of the barrier opening spring 25 is set in advance to be stronger than the forces of the barrier closing springs 26 for urging the second barrier blades 23 in the directions for closing the second barrier blades 23. For this reason, the urging force of the barrier opening spring 25 causes the barrier drive ring 24 to start clockwise rotation against the forces of the barrier closing springs 26, and the barrier blade contact parts 24c of the barrier drive ring 24 push contact parts 23b of the second barrier blades 23. As a consequence, the second barrier blades 23 are urged in the blade opening directions and retracted from the shooting opening of the barrier cover 27 and are opened as shown in FIG. 10B.

At this time, the opening operations of the first barrier blades 22 and the second barrier blades 23 are interlocked by contact parts 22b and the contact parts 23b as in their closing operations. More specifically, when the rotational force of the barrier drive ring 24 causes the second barrier blades 23 to start pivotal motion in the blade opening directions and the contact parts 23b are brought into contact with the contact parts 22b, the first barrier blades 22 start to be pivotally moved in the opening directions in unison with the second barrier blades 23.

When the barrier drive ring 24 performs a clockwise rotation during extension of the lens barrel 10, the rotational force is transmitted to the first-group lens-holding frame 21 via the rotational force-transmitting hole 24d, whereby the first-group lens-holding frame 21 is also rotated. At this time, since the first-group lens-holding frame 21 is in a state cam-fitted with the first-group barrel 101, the rotation of the barrier drive ring 24 causes the first-group lens-holding frame 21 to move in the optical axis direction while rotating, following the paths of the cams 101d formed on the inner peripheral surface of the first-group barrel 101. More specifically, during lens extension, the first-group lens-holding frame 21 is caused to move in the optical axis direction while rotating, and a rotation locking part 21d of the first-group lens-holding frame 21 and the rotation locking part 101f of the first-group barrel 101 are held in contact with each other, as shown in FIG. 11B.

Note that the first-group lens-holding frame 21 is driven only by the urging force of the barrier opening spring 25 as described hereinabove, and therefore, if a strong spring is employed, the operation load on the lens barrel 10 during retraction operation is increased. To avoid this, fitting between the follower pins 21a of the first-group lens-holding frame 21 and the cams 101d of the first-group barrel 101 is set to be slightly loose, as mentioned hereinbefore, whereby the operation load on the lens barrel 10 is reduced.

Extension and retraction of the lens barrel 10 will be further described with reference to FIGS. 1, 2, 12A, 12B, 13A, 13B, and 14A to 14C. FIGS. 12A and 12B and FIGS. 13A and 13B are views of the first-group lens-holding frame 21, the barrier drive ring 24, and the second movable cam barrel 113 in the state where the lens barrel 10 is extended. Each upper view is a front view, each intermediate view is a side view, and each lower view is a cross-sectional view. Although FIGS. 12A and 12B and FIGS. 13A and 13B do not show the whole of the first-group barrel 101, illustration of a follower pin 101a of the first-group barrel 101 makes it possible to clearly grasp movement of the first-group barrel 101 in respect of the optical axis direction.

Figure 14A:
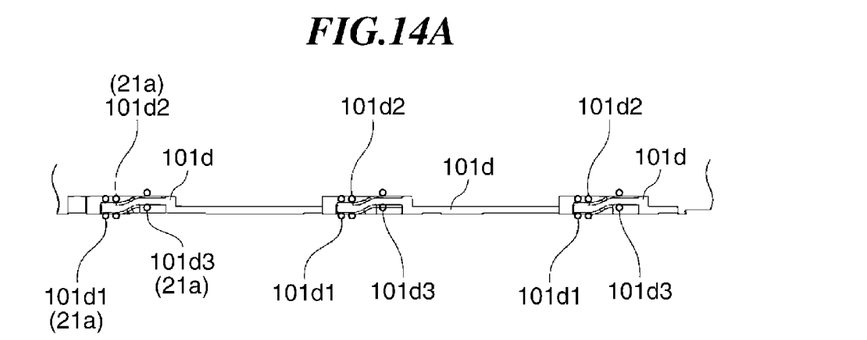
FIG. 14A is an unfolded view of the inner peripheral surface of the first-group barrel appearing in FIG. 3.
Figure 14B:
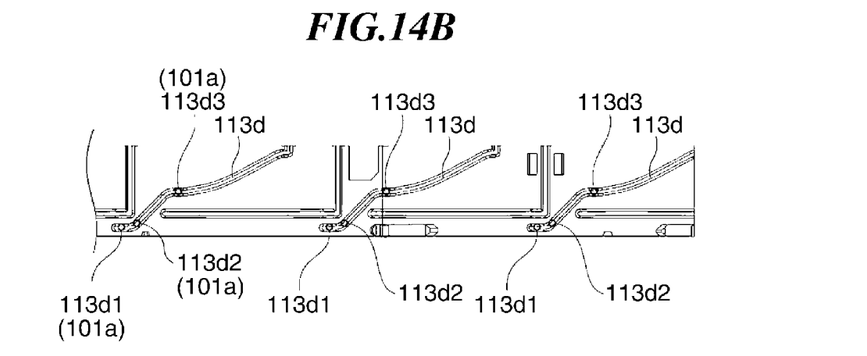
FIG. 14B is an unfolded view of the outer peripheral surface of the second movable cam barrel appearing in FIG. 3.
Figure 14C:
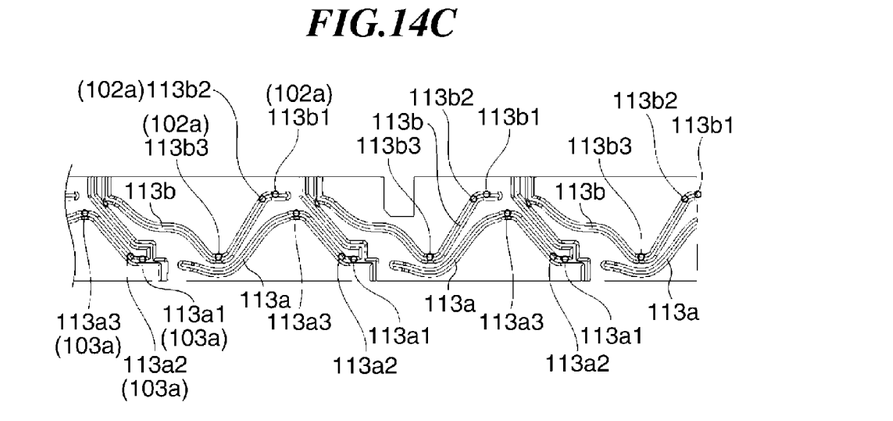
FIG. 14C is an unfolded view of the inner peripheral surface of the second movable cam barrel.

FIG. 14A is an unfolded view of the inner peripheral surface of the first-group barrel 101. FIG. 14A shows the relationship between the follower pins 21a (whose positions are indicated by reference numerals 101d1 to 103d3) of the first-group lens holding frame 21 and the cams 101d of the first-group barrel 101. FIG. 14B is an unfolded view of the outer peripheral surface of the second movable cam barrel 113. FIG. 14B shows the relationship between the first-group shift cam grooves 113d of the second movable cam barrel 113 and the follower pins 101a (whose positions are indicated by reference numerals 113d1 to 113d3) of the first-group barrel 101. Further, FIG. 14C is an unfolded view of the inner peripheral surface of the second movable cam barrel 113. FIG. 14C shows the relationship between the second-group shift cam grooves 113b and third-group shift cam grooves 113a of the second movable cam barrel 113 and the follower pins 102a (whose positions are indicated by reference numerals 113b1 to 113b3) of the second-group barre 102 and the follower pints 103a (whose positions are indicated by reference numerals 113a1 to 113a3) of the third-group lens holding member 103.

Figure 12A:
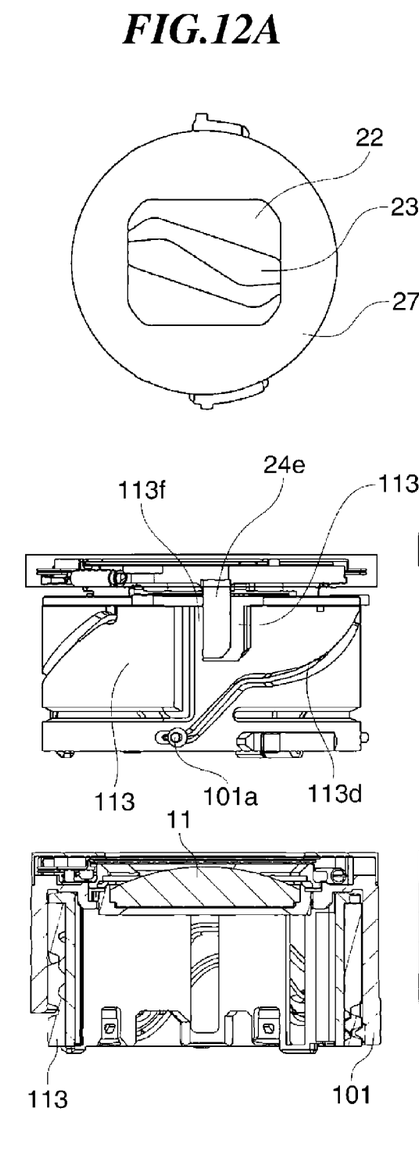
FIG. 12A is a first view showing the first-group lens-holding frame, the barrier drive ring, and the second movable cam barrel during extension of the lens barrel.

A state shown in FIG. 12A corresponds to the collapsed state of the lens barrel 10 shown in FIG. 1. The follower pins 101a, 102a, and 103a of the first-group barrel 101, the second-group barrel 102, and the third-group lens holding member 103 are slidably fitted in the first-group shift cam grooves 113d, the second-group shift cam grooves 113b, and the third-group shift cam grooves 113a of the second movable cam barrel 113, respectively. Therefore, the fitting positions of the respective follower pins 101a, 102a, and 103a in the FIG. 12A state correspond to the position 113d1 in FIG. 14B and the positions 113b1 and 113a1 in FIG. 14C, respectively.

In the collapsed state of the lens barrel 10, since the horn part 24e of the barrier drive ring 24 is held in contact with the contact part 113f of the second movable cam barrel 113, the rotational force applied to the barrier drive ring 24 by the barrier opening spring 25 is suppressed. For this reason, the first barrier blades 22 and the second barrier blades 23 are urged in the closing directions by the spring forces of the barrier closing springs 26, whereby the opening (shooting opening) of the barrier cover 27 is covered.

Since the rotation of the barrier drive ring 24 is suppressed, the rotation of the first-group lens-holding frame 21 is also suppressed. In this state, the first-group lens-holding frame 21 is supported by the first-group barrel 101, and the follower pins 21a are fitted on the associated cam 101d of the first-group barrel 101 at the position 101d1 in the FIG. 14A.

When the zoom motor 110a is driven to shift the lens barrel 10 from the collapsed state in FIG. 1 to the shooting-ready state in FIG. 2, the rotational force of the zoom motor 110a is transmitted to the gear section 111c of the first movable cam barrel 111 via the gear train and the gear 110b. As a consequence, the first movable cam barrel 111 starts to be rotated, and is thereby extended in the optical axis direction, according to the fitting relationship between the follower pins 111d and the cam grooves 106a formed in the inner peripheral surface of the fixed cam barrel 106. At this time, the first straight advance guide plate 112, which is bayonet-coupled to the first movable cam barrel 111 and is thereby supported by the same without play in the optical axis direction and in the radial direction, with its rotation restricted by the fixed cam barrel 106, is rectilinearly moved in the same path as the first movable cam barrel 111.

When the first movable cam barrel 111 starts to be rotated to start an extension operation, the rotation is transmitted to the second movable cam barrel 113 via the straight advance guide grooves 111b formed in the first movable cam barrel 111. Further, the first-group barrel cover 115, which has the follower pins 115a slidably fitted in the cam grooves 111a formed in the inner peripheral surface of the first movable cam barrel 111 and has its rotation restricted by the first straight advance guide plate 112, is rectilinearly moved in the optical axis direction along a predetermined path in accordance with the rotation of the first movable cam barrel 111.

Further, the first-group barrel cover 115 and the second movable cam barrel 113 are cam-fitted with each other by the follower pins 115b of the first-group barrel cover 115 and the cam grooves 113e of the second movable cam barrel 113, and the second straight advance guide barrel 114 and the second movable cam barrel 113 are bayonet-coupled to each other. Therefore, the second movable cam barrel 113 is extended in the optical axis direction while being rotated, and the second straight advance guide barrel 114 is rectilinearly moved in the optical axis direction.

The first-group barrel 101, the second-group barrel 102, and the third-group lens holding member 103 are cam-fitted in the second movable cam barrel 113. Therefore, when the second movable cam barrel 113 is extended while being rotated, the first-group barrel 101, the second-group barrel 102, and the third-group lens holding member 103 are rectilinearly guided in the optical axis direction along predetermined paths by the straight advance guide grooves 114a and 114b and guide parts 114c of the second straight advance guide barrel 114.

When the second movable cam barrel 113 is rotated, the contact part 113f of the second movable cam barrel 113 is moved away from the horn part 24e of the barrier drive ring 24 in the rotational direction, whereby the charge force of the barrier opening spring 25 is released. As a consequence, the barrier drive ring 24 starts to be rotated clockwise along with the second movable cam barrel 113 in accordance with the rotation of the same.

When the barrier drive ring 24 starts to be rotated clockwise, the barrier blade contact parts 24c of the barrier drive ring 24 are brought into contact with the contact parts 23b of the second barrier blades 23, as shown in FIG. 10A, whereby the second barrier blades 23 start an opening operation. When the second barrier blades 23 start to be opened, the contact parts 23b are brought into contact with the contact parts 22b of the first barrier blades 22, whereby the first barrier blades 22 are pivotally moved in the opening directions in a manner interlocked with the second barrier blades 23.

Figure 12B:
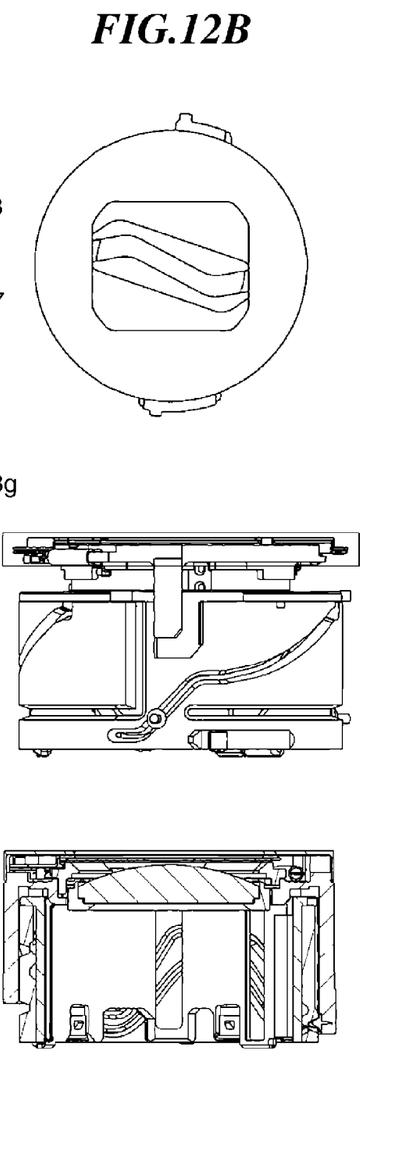
FIG. 12B is a second view showing the first-group lens-holding frame, the barrier drive ring, and the second movable cam barrel during extension of the lens barrel.

As the first barrier blades 22 and the second barrier blades 23 are opened in accordance with rotation of the barrier drive ring 24 as described above, they are retracted from the opening of the barrier cover 27. A state at this time is shown in FIG. 12B. In the state in FIG. 12B, the first-group lens-holding frame 21 also starts to be rotated via the rotational force-transmitting hole 24d in accordance with rotation of the barrier drive ring 24, but it has not been extended in the optical axis direction yet.

In the state in FIG. 12B, the positions of the respective follower pins 101a, 102a, and 103a of the first-group barrel 101, the second-group barrel 102, and the third-group lens holding member 103 are indicated by 113d2 in FIG. 14B and 113b2 and 113a2 in FIG. 14C, respectively. The follower pins 21a of the first-group lens-holding frame 21 are in a state fitted on the respective cams 101d of the first-group barrel 101 at the respective positions 101d2 in FIG. 14A. The first-group barrel 101 starts to be shifted in the optical axis direction, and be relatively moved away from the second movable cam barrel 113, the second straight advance guide barrel 114, and the first-group barrel cover 115. At this time, the movement of the first-group barrel 101 follows the paths of the first-group shift cam grooves 113d, the second-group shift cam grooves 113b, and the third-group shift cam grooves 113a.

When the first-group barrel 101 and the second movable cam barrel 113 are thus moved away from each other in the optical axis direction, the horn part 24e of the barrier drive ring 24 and the contact part 113f of the second movable cam barrel 113, which were held in contact with each other in the collapsed state of the lens barrel 10, are also moved away from each other in the optical axis direction. When the second movable cam barrel 113 is further rotated, the barrier drive ring 24 is also further rotated, whereby the first barrier blades 22 and the second barrier blades 23 enter a state completely retracted from the opening of the barrier cover 27, as shown in FIG. 13A.

In accordance with the rotation of the barrier drive ring 24, the first-group lens-holding frame 21 also continues to be extended while being rotated. As a consequence, when the rotation locking part 21d of the first-group lens-holding frame 21 and the rotation locking part 101f of the first-group barrel 101 are brought into contact as shown in FIG. 11B, the whole sequence of the opening operations of the first barrier blades 22 and the second barrier blades 23 and the extension operation of the first-group lens-holding frame 21 is completed. FIG. 13A shows a state where the whole sequence of the operations has been completed.

Figure 13A:
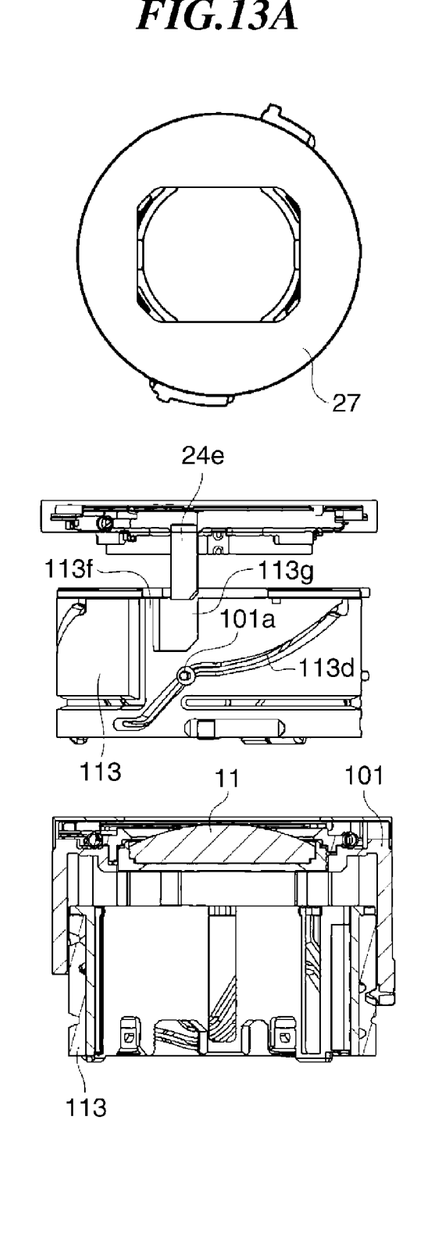
FIG. 13A is a third view showing the first-group lens-holding frame, the barrier drive ring, and the second movable cam barrel during extension of the lens barrel.

When the rotation locking part 21d of the first-group lens-holding frame 21 and the rotation locking part 101f of the first-group barrel 101 are brought into contact with each other, the first lens group 11 is extended to a space which was occupied by both the first barrier blades 22 and the second barrier blades 23 in the closed state, as shown in FIG. 13A. At this time, each of the follower pins 21a of the first-group lens-holding frame 21 has reached a position 101d3 in FIG. 14A.

Figure 13B:
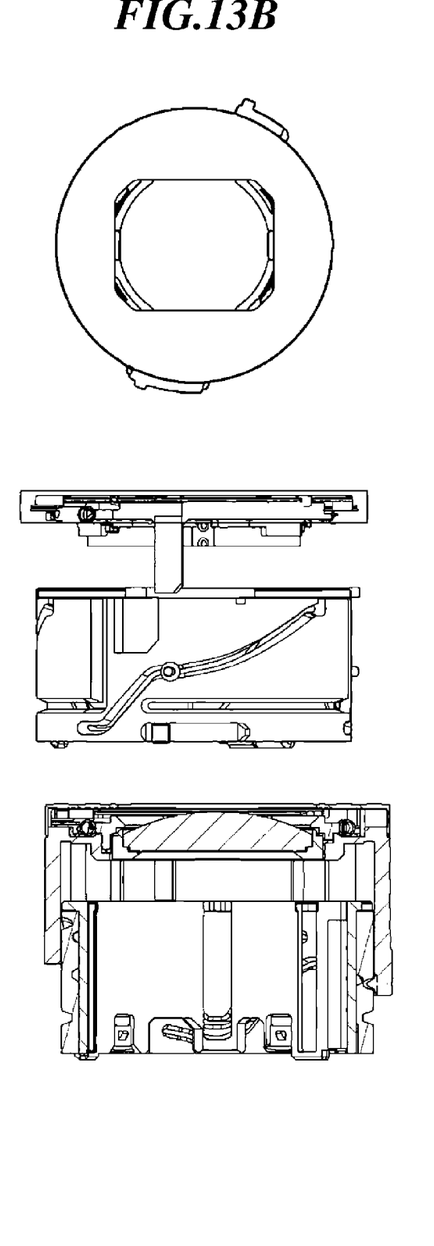
FIG. 13B is a fourth view showing the first-group lens-holding frame, the barrier drive ring, and the second movable cam barrel during extension of the lens barrel.

When the second movable cam barrel 113 is further rotated from this state, the first-group barrel 101 and the second movable cam barrel 113 are further moved away from each other in the optical axis direction. Then, as shown in FIG. 13B, the horn part 24e of the barrier drive ring 24 and the contact part 113*f* of the second movable cam barrel 113 are brought out of a state overlapping in the optical axis direction. Thus, the follower pins 101*a*, 102*a*, and 103*a* of the first-group barrel 101, the second-group barrel 102, and the third-group lens holding member 103 reach positions 113*d*3 in FIG. 14B and positions 113*b*3 and 113*a*3 in FIG. 14C, respectively, and the lens barrel enters a shooting state.

As is apparent from the above description, the extended position of the first lens group 11 in the lens barrel 10 with respect to a CCD image pickup surface is determined based on the total value of the amount of movement of the first movable cam barrel 111, the amount of movement of the second movable cam barrel 113, and the amount of movement of the first-group lens-holding frame 21 relative to the first-group barrel 101.

In the lens barrel 10 according to the present embodiment, the first-group lens-holding frame 21 is moved in the optical axis direction after the first barrier blades 22 and the second barrier blades 23 start to be opened, and hence the first barrier blades 22 and the second barrier blades 23 do not interfere with the first-group lens-holding frame 21. Thus, in the shooting state, it is possible to extend the first-group lens-holding frame 21 up to a position where a part of the first lens group 11 overlaps the first barrier blades 22 and the second barrier blades 23 in the optical axis direction.

Further, in order to reduce operation load of the lens barrel, a slight amount of play is allowed for fitting between the follower pins 21*a* of the first-group lens-holding frame 21 and the cams 101*d* of the first-group barrel 101. However, in the shooting state, the first-group lens-holding frame 21 is supported by the first-group barrel 101 in a state locked by the rotation locking part 21*d*. Further, the first-group lens-holding frame 21 is always urged by the opening sprint 25, and the contact part of the rotation locking part 21*d* is shaped such that the first-group lens-holding frame 21 is always biased in the same direction. With this arrangement, even though a slight play is allowed for fitting between the follower pins 21*a* of the first-group lens-holding frame 21 and the cams 101*d* of the first-group barrel 101, the first-group lens-holding frame 21 is capable of performing highly accurate positioning that satisfies the requirements of optical performance, thanks to the biasing effect.

Further, the horn part 24*e* of the barrier drive ring 24 and the second movable cam barrel 113 overlap each other in the optical axis direction until halfway through the zooming, so that a rotation assist part 113*g* (see FIG. 4A) of the second movable cam barrel 113 assists rotation of the horn part 24*e* of the barrier drive ring 24. With this arrangement, even if dust, such as sand, comes into the opening of the barrier cover 27 from the outside and hinders the rotation of the barrier drive ring 24, the barrier drive ring 24 can brush away the dust and be moved while being rotated. Further, the rotation assist part 113*g* is held in contact with the horn part 24*e* until the follower pins 21*a* of the first-group lens-holding frame 21 reach the respective positions 101*d*3 in FIG. 14A. Therefore, even when the rotation of the barrier drive ring 24 is hindered e.g. by dust from the outside, the first-group lens-holding frame 21 can be reliably moved while being rotated, to a shooting position.

The rotation assist part 113*g* of the second movable cam barrel 113 and the horn part 24*e* of the barrier drive ring 24 are held in contact with each other. Therefore, the digital camera may be configured such that an extension error is promptly output, when the first barrier blades 22 and the second barrier blades 23 are pressed from the outside by a larger force and hence the lens barrel 10 cannot be driven.

When the power of the digital camera is switched off and the zoom motor 110*a* is driven in the reverse direction, the lens barrel 10 performs a retraction (housing) operation in a procedure reverse to that of the extension operation, thereby shifting to the collapsed state. At this time, when the second movable cam barrel 113 starts to be rotated counterclockwise by being driven by the zoom motor 110*a*, the first-group barrel 101, the second-group barrel 102, and the third-group lens holding member 103 are retracted in the optical axis direction through the cam-fitting, similarly to the extension operation.

When the first-group barrel 101 performs a retraction operation in accordance with rotation of the second movable cam barrel 113, the horn part 24*e* of the barrier drive ring 24 reaches a position where it overlaps the contact part 113*f* of the second movable cam barrel 113 in the optical axis direction. When the second movable cam barrel 113 performs further rotation, the contact part 113*f* of the second movable cam barrel 113 is brought into contact with the horn part 24*e* of the barrier drive ring 24 again and continues rotation against the rotational force of the barrier opening spring 25. This causes the barrier drive ring 24 to also start counterclockwise rotation.

The rotation of the barrier drive ring 24 causes the first barrier blades 22 and the second barrier blades 23 to pivotally move in the closing directions, and the first-group lens-holding frame 21 also starts to be retracted following the paths of the cams 101*d* of the first-group barrel 101. When the first movable cam barrel 111 is moved while being rotated to a predetermined position (position in the collapsed state), the retraction is completed, and the lens barrel 10 enters the collapsed state.

As described above, since the cams 101*d* are formed on the inner periphery of the first-group barrel 101, and the first-group lens-holding frame 21 is cam-driven by the rotational force of the barrier drive ring 24, it is possible to increase a lens extension amount while maintaining a reduced thickness (length in the optical axis direction) of the lens barrel 10. Further, in the shooting state, the first-group lens-holding frame 21 and the first-group barrel 101 are held in contact with each other in a state urged by the barrier opening spring 25, and therefore the first-group lens-holding frame 21 is necessary biased in a predetermined direction. This makes it possible to maintain high positioning accuracy in positioning the first-group lens-holding frame 21, to thereby maintain high optical performance.

Further, since the first-group lens-holding frame 21 is formed with the static pressure-receiving parts 21*c*, it is possible to realize a construction resistant to external forces. Furthermore, the barrier drive ring 24 is moved in a manner interlocked with the second movable cam barrel 113, so that when the power of the digital camera is switched on in a state where an external force is applied to the first barrier blades 22 and the second barrier blades 23, extension of the lens barrel 10 is inhibited. This makes it possible to detect an error easily and promptly and output an extension error to a photographer.

Although in the above-described embodiment, the cams 101*d* are formed on the inner periphery of the first-group barrel 101, cam grooves may be formed in place of the cams 101*d*. Further, as for transmission of rotation between the first-group lens-holding frame 21 and the barrier drive ring 24, the relationship between the shaft (rotational force-transmitting projection 21*b*) and the hole (rotational force-transmitting hole 24*d*) may be reversed. Furthermore, although in the above-described embodiment, the zoom lens barrel is formed by four groups, this is not limitative. In addition, the rotation locking part 101*f* appearing in FIG. 11B may have any shape insofar as it can constantly bias the first-group lens-holding frame 21 in the same direction.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims priority from Japanese Patent Application No. 2011-153874 filed Jul. 12, 2011, which is hereby incorporated by reference herein in its entirety.

What is claimed is:

1. A lens barrel comprising:
a first barrel configured to be movable in an optical axis direction and having a cam formed on an inner periphery thereof, said first barrel being moved in the optical axis direction in a case where the lens barrel is switched from a collapsed state to a shooting state;
a lens holding member configured to hold a lens, said lens holding member including a fitting portion for being slidably fitted to the cam and being capable of moving in the optical axis direction relative to said first barrel, following the cam;
a barrier member disposed on an object side of the lens configured to be capable of being opened and closed;
a barrier driving member connected to said lens holding member and configured to be rotatable so as to open and close said barrier member,
a second barrel; and
an urging member attached to said barrier driving member and configured to urge said lens holding member and said barrier driving member in a predetermined direction,
wherein rotation of said barrier driving member causes said lens holding member to move in the optical axis direction relative to said first barrel, and
wherein in a case where the lens barrel is in the collapsed state, said second barrel rotates said lens holding member and said barrier driving member in a direction against an urging force of said urging member.

2. The lens barrel according to claim 1, wherein said second barrel includes a notch configured to be used for causing rotation of said lens holding member and said barrier driving member, and
wherein said barrier driving member includes a projection configured to be brought into contact with said notch in a case where the lens barrel is in the collapsed state and to be moved away from said notch in a case where the lens barrel is in shooting state, and
wherein said notch and said projection overlap each other in the optical axis direction until the lens barrel is switched from a collapsed state to the shooting state.

3. The lens barrel according to claim 1, wherein said first barrel has an engagement portion configured to hold said lens holding member, and
wherein in a case where the lens barrel is in the shooting state, said lens holding member urged by said urging member is in contact with said engagement portion.

4. The lens barrel according to claim 1, wherein in a case where the lens barrel is in the collapsed state, the lens is disposed rearward of said barrier member in the optical axis direction, and
wherein in a case where the lens barrel is in the shooting state, part of the lens is extended to a position where the part overlaps said barrier member in the optical axis direction.

5. The lens barrel according to claim 1, wherein said urging member urges said barrier driving member so as to open said barrier member.

6. The lens barrel according to claim 1, wherein the fitting portion of said lens holding member is formed by two pin-shaped portions arranged side by side in the optical axis direction.

7. An image pickup apparatus including a lens barrel that makes it possible to perform shooting when in an extended state, wherein the lens barrel comprises:
a first barrel configured to be movable in an optical axis direction and having a cam formed on an inner periphery thereof, said first barrel being moved in the optical axis direction in a case where the lens barrel is switched from a collapsed state to a shooting state;
a lens holding member configured to hold a lens, said lens holding member including a fitting portion for being slidably fitted to the cam and being capable of moving in the optical axis direction relative to said first barrel, following the cam;
a barrier member disposed on an object side of the lens configured to be capable of being opened and closed;
a barrier driving member connected to said lens holding member and configured to be rotatable so as to open and close said barrier member,
a second barrel; and
an urging member attached to said barrier driving member and configured to urge said lens holding member and said barrier driving member in a predetermined direction,
wherein rotation of said barrier driving member causes said lens holding member to move in the optical axis direction relative to said first barrel, and
wherein in a case where the lens barrel is in the collapsed state, said second barrel rotates said lens holding member and said barrier driving member in a direction against an urging force of said urging member.

* * * * *